US010239727B2

(12) United States Patent
Gonzalez Gallegos

(10) Patent No.: US 10,239,727 B2
(45) Date of Patent: Mar. 26, 2019

(54) METHOD AND ARRANGEMENT FOR CONTROL AND EVALUATION OF THE OPERATION OF A LIFT

(71) Applicant: DINACELL ELECTRÓNICA, S.L., Madrid (ES)

(72) Inventor: Rafael Gonzalez Gallegos, Madrid (ES)

(73) Assignee: Dinacell Electronica, S.L., Madrid (ES)

( * ) Notice: Subject to any disclaimer, the term of this patent is extended or adjusted under 35 U.S.C. 154(b) by 416 days.

(21) Appl. No.: 15/024,147

(22) PCT Filed: Sep. 23, 2013

(86) PCT No.: PCT/ES2013/070663
§ 371 (c)(1),
(2) Date: Mar. 23, 2016

(87) PCT Pub. No.: WO2015/040251
PCT Pub. Date: Mar. 26, 2015

(65) Prior Publication Data
US 2016/0236902 A1     Aug. 18, 2016

(51) Int. Cl.
*B66B 1/34* (2006.01)
*G01G 23/01* (2006.01)
(Continued)

(52) U.S. Cl.
CPC .......... *B66B 1/3476* (2013.01); *B66B 5/0031* (2013.01); *B66B 5/14* (2013.01); *G01G 19/14* (2013.01); *G01G 23/01* (2013.01)

(58) Field of Classification Search
CPC ....... B66B 1/3476; B66B 5/0031; B66B 5/14; G01G 19/14; G01G 23/01
(Continued)

(56) References Cited

U.S. PATENT DOCUMENTS 4,330,838 A * 5/1982 Yoneda ................. B66B 5/0087
187/393
4,674,605 A * 6/1987 McPherson .......... B66B 1/3484
187/392
(Continued)

FOREIGN PATENT DOCUMENTS

CN        2630214 Y      8/2004
CN      202744118 U      2/2013
(Continued)

OTHER PUBLICATIONS

English Abstract of CN2630214Y.
(Continued)

*Primary Examiner* — Anthony Salata
(74) *Attorney, Agent, or Firm* — Ladas & Parry LLP

(57) ABSTRACT

An automated method to control and evaluation of the operation of a lift installation, where at least one load of unknown weight is weighed by means of a weighing machine; the sum of the weights detected on site in the lift installation where the maintenance work is being performed is transmitted to a portable control console, which transmits the sum of the weights detected associated with the loads introduced to the lift cabin to a load weighing device; to receive command signals associated with the control and maintenance tasks transmitted from the portable control console, in response to operating parameters of the lift cabin loaded with the sum of the weights detected.

4 Claims, 1 Drawing Sheet

(51) Int. Cl.
  *G01G 19/14* (2006.01)
  *B66B 5/00* (2006.01)
  *B66B 5/14* (2006.01)

(58) Field of Classification Search
  USPC ..... 187/247, 277, 391, 393, 414; 177/25.13,
    177/50, 132, 136, 145, 147, 148; 702/1,
    702/101, 173, 174; 701/50
  See application file for complete search history.

(56) References Cited

U.S. PATENT DOCUMENTS

| | | | | |
|---|---|---|---|---|
| 5,343,003 | A * | 8/1994 | Jamieson | B66B 1/3476 177/132 |
| 6,330,935 | B1 * | 12/2001 | Systermans | B66B 5/0025 187/391 |
| 6,576,849 | B2 * | 6/2003 | Bliss | G01G 23/01 177/199 |
| 6,863,161 | B2 * | 3/2005 | Mearns | B66B 5/0006 187/247 |
| 7,004,289 | B2 * | 2/2006 | Shrum, III | B66B 5/0037 187/393 |
| 7,222,698 | B2 * | 5/2007 | Hanninen | B66B 5/0093 187/393 |
| 7,441,436 | B2 * | 10/2008 | Bliss | G01G 23/01 177/50 |
| 8,028,807 | B2 * | 10/2011 | Deplazes | B66B 5/0025 187/247 |
| 9,061,864 | B2 * | 6/2015 | Spirgi | B66B 5/0037 |
| 9,120,645 | B2 * | 9/2015 | Penn | B66B 11/06 |
| 9,546,898 | B2 * | 1/2017 | Kovacs | G01G 19/44 |

FOREIGN PATENT DOCUMENTS

| | | |
|---|---|---|
| EP | 1958911 A1 | 8/2008 |
| JP | S55-149019 A | 11/1980 |
| JP | S6047926 A | 3/1985 |
| JP | H10109852 A | 4/1998 |
| JP | H10120328 A | 5/1998 |
| JP | H1111817 A | 1/1999 |
| JP | 2002/087721 A | 3/2002 |
| JP | 2004/168434 A | 6/2004 |
| JP | 2005/132543 A | 5/2005 |
| JP | 2005/145620 A | 6/2005 |
| SG | 66287 A1 | 7/1999 |
| WO | 2006/046909 A1 | 5/2006 |
| WO | 2007/075225 A1 | 7/2007 |

OTHER PUBLICATIONS

English Abstract of JP 2005/132543 A.
English Abstract of CN 202744118U.
English Abstract of JP 2005/145620 A.
English Abstract of JP 2004/168434 A.
English Abstract of JP S55-149019 A.
English Abstract of JP 2002/087721 A.
English Abstract of JP H1111817 A.
English Abstract of JP H10120328 A.
English Abstract of JP H10109852 A.
English Abstract of JP S6047926 A.

* cited by examiner

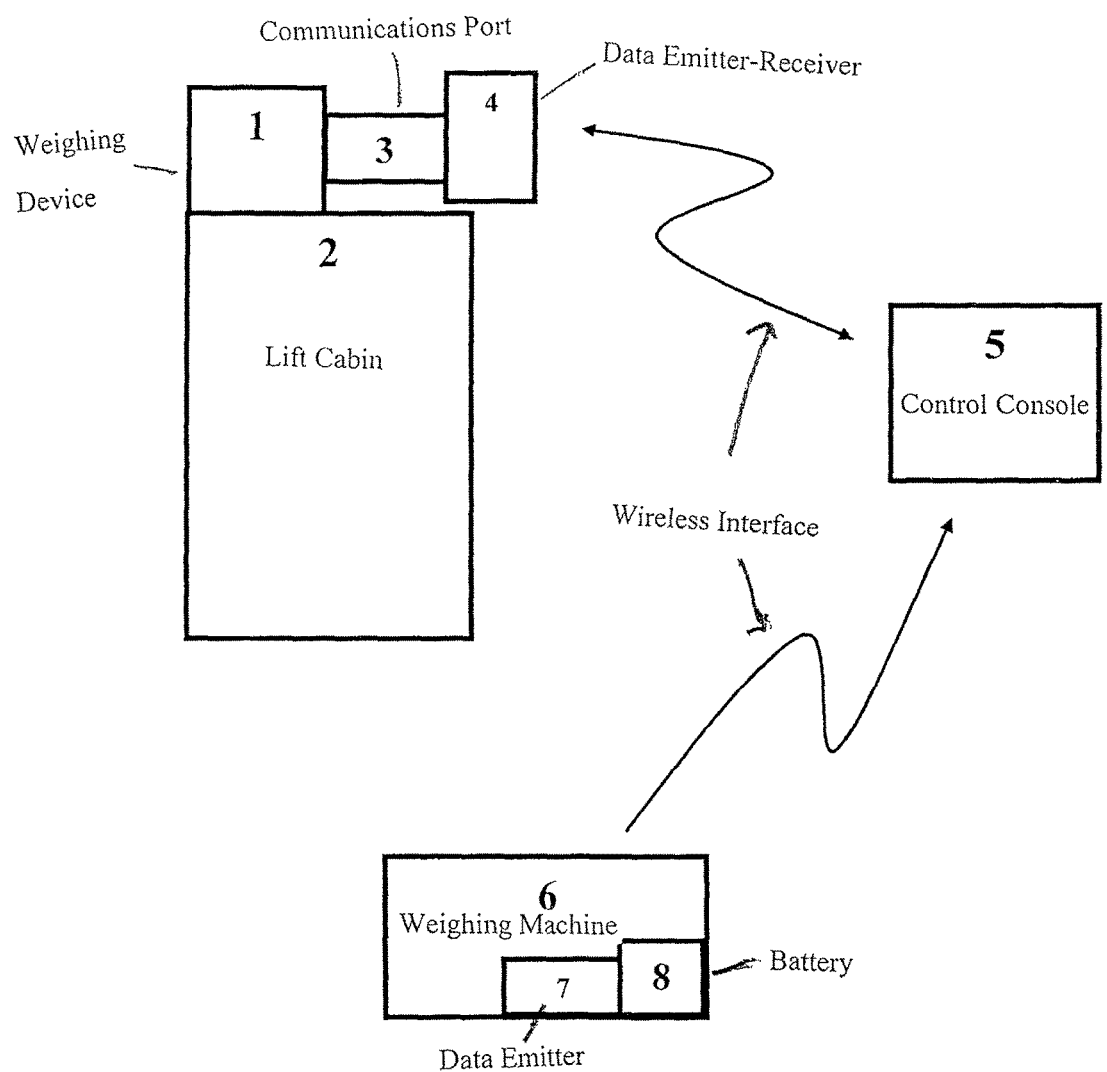

METHOD AND ARRANGEMENT FOR CONTROL AND EVALUATION OF THE OPERATION OF A LIFT

CROSS-REFERENCE TO RELATED APPLICATION

This U.S. application claims priority under 35 U.S.C. 371 to, and is a U ,S National Phase application of, the International Patent Application No. PTC/ES2013/070663,filed 23 Sep. 2013, the disclosures of which. are incorporated in their entirety by reference herein.

SUBJECT

The present invention refers to a method and an automatic arrangement for control and evaluation of the operation of a lift.

STATE OF THE ART

There is a known need for performing periodic conservation and maintenance work on the various installations of a lift to maintain the lift itself in service, preventing the appearance of operating faults in a lift facility or the lift itself. On some occasions long downtimes occur until the cause of a fault has been determined and it has been rectified on site.

Conservation and maintenance tasks require the performing of work on the outside of the lift cabin. For example, access needs to be gained to the load weighing device to confirm proper operation of the load control system or the lift load limiter.

The lift load control system is a measurement and automatic load limiting device with the purpose of continuously and automatically measuring and reporting the weight introduced to the lift cabin and, if the weight exceeds a predetermined load set by the lift facility conservator, it prevents the lift from starting and informs the user of this anomalous situation.

The performing of maintenance work, especially outside of the lift cabin, represents a safety risk to the operators who perform the conservation and maintenance work on the lift and this work will be a determining factor for both good lift operation and the safety of its passengers.

The lift conservation and maintenance work requires the use of loads of known weight to evaluate the proper operation of the load control system. Furthermore, the lift chain also needs dynamic compensation, as once the lift is operating, it does not weigh the same on the ground floor as on the top floor. The handling and transfer of loads, the making of trips with loads inside the cabin and an operator outside the lift cabin to perform maintenance work is awkward, uncomfortable and has potential risks for the operators who perform the maintenance work.

SUMMARY

The present invention seeks to resolve one or more of the disadvantages stated previously by means of a method and an automatic arrangement for control as defined in the claims.

One aspect is to supply an automatic arrangement for control and evaluation of the operation of a lift comprising a weight detector adapted to measure weight, sum the weights detected, a display unit and a data emitter that transmits radio signals associated with the weights detected; a load weighing device adapted to measure the lift load, including a data emitter-receiver adapted to communicate data, wirelessly, associated with the parameters measured by the load weighing device; and a portable control console that includes a data transmitter-receiver for wireless communications and a data input interface.

The portable control console can be connected via Wi-Fi or Bluetooth to the weight detector and the load weighing device, such that with a single control console and a single weight detector it is possible to perform conservation and maintenance work on different lift installations.

The control console is capable of converting the data received from the load weighing device and the weight detector to command signals. On receiving all the data and parameters in the control console, it is possible to perform the conservation and maintenance tasks and reduce the time the operator spends on the outside of the lift cabin and moving loads of predetermined weights, which represent a high cost in time and labour.

Proper operation of the lift installations and the lift can be confirmed by means of control interactions from the control console and the lift operating parameters can also be corrected according to the data received by the portable control console. That is to say, the automatic control arrangement makes it possible to perform an analysis and preventive evaluation of proper lift installation operation.

The control console is capable of supplying information on the lift installation in any form, simplifying the conservation and maintenance work and extending the conservation service features.

An automated method for control and evaluation of the operation of a lift installation, comprising the weighing of at least one load of unknown weight by means of a weighing machine; transmission via a data emitter, included in the weighing machine, of the sum of the weights detected on site in the lift installation where the maintenance work is being performed, to a portable control console, of the sum of the weights detected associated with the loads introduced to the lift cabin to a load weighing device; and receipt via a data emitter-receiver, included in the load weighing device, of command signals associated with the control and maintenance tasks transmitted from the portable control console, in response to operating parameters of the lift cabin loaded with the sum of the weights detected.

With all of this, the automated method for control and evaluation of lift operation and safety is essentially based on the use of an automatic control arrangement where the various items of equipment of the arrangement can be connected by means of wireless connections, specifically via Wi-Fi or Bluetooth, making it possible to perform control actions and evaluate operation, conservation and maintenance remotely via radio, avoiding the need to act directly on the load weighing device located on the top of the lift cabin.

The automatic control arrangement reduces the number of times that an operator goes outside the lift cabin, preventing accidents due to falls or trapping.

It enables the operator to receive all the operating data in the control console and to adjust parameters and calibrate the lift installation through this console.

It simplifies the load weighing device as it is not necessary to build an audio-visual screen into the load weighing device.

The use of a weighing machine which is also portable avoids the costly movement of weights of known, predetermined weight.

BRIEF DESCRIPTION OF THE FIGS.

A more detailed explanation of the device in accordance with the embodiments of the invention is given in the following description based on the attached figures, in which:

FIG. 1 shows, in a block diagram, a schematic representation of an automatic control arrangement adapted to perform an automated method for control and evaluation of the operation and safety of a lift.

DESCRIPTION OF AN EMBODIMENT

In relation to FIG. 1, an automatic arrangement is illustrated for a lift installation that comprises a lift cabin 2 that moves through a shaft. The lift cabin 2 is suspended by cables led through a drive pulley.

To record the weight of the people or objects in the lift cabin 2, a load weighing device or load measurement device 1 is anticipated. The lift cabin 2 includes an indicator device to communicate information to the user, such as the current lift cabin position or level of loading of the lift cabin 2.

As stated, the automatic control arrangement includes the load weighing device 1, a weighing machine or weight detector 6 adapted to measure weight outside the lift cabin 2 and a control console 5.

As an essential characteristic of the control arrangement, the weighing machine 6 comprises a data emitter 7, with a battery 8 power supply, that transmits radio signals associated with the weight measurements made. The load weighing device 1 also includes a data. emitter-receiver 4 adapted to communicate wirelessly data associated with the parameters measured by the load weighing device; and the portable control console 5 furthermore includes a data transmitter-receiver for wireless communications. That is to say, the weighing machine 6 and the load weighing device I needed to perform the conservation and maintenance work on the lift installation are connected to the control console 5 by means of a wireless interface of the WiFi or Bluetooth type.

The weighing machine is equipped with an auto power off function when it does not detect the control console.

The load weighing device 1 is installed on top of the lift cabin 2, including a wireless communications port 4 connected to the data emitter-receiver 4 via a port of the USB type. The load weighing device is adapted to monitor and record the load located inside the lift cabin. Where appropriate, if the weight exceeds a predetermined load threshold, it prevents the lift from starting and informs the user of the anomalous situation.

In this way, this load weighing device collects the necessary parameters in a conventional form, such as alarms, hold, universal input with a range of 24 to 230 V AC or DC, which has the function of blocking the weighing during operation to prevent the relays from changing state due to the movement of the lift and to know when the lift changes floor, to compensate for the chain, parameter values, etc.

The portable control console 5, which can be moved by the operator to any lift installation, also includes a data transmitter-receiver, which can be connected via Wi-Fi or Bluetooth to any load weighing device with a data emitter-receiver.

This control console 5 is adapted to execute a control and maintenance policy, based on the data signals received from the load weighing device and captured by the latter during current lift operation, supplying command, adjustment and calibration signals to the load weighing device. That is to say, the console interacts with the load weighing device to make adjustments to weight, calibration of direct transmission cells, zero setting or auxiliary functions, such as configuration of the load weighing device and the state of the relays, putting the system into low consumption mode, detection of load weighing device errors, poor load cell connection, negative overflow, positive overflow, polarity error, cabin display output, short circuit, loss of data in memory, etc.

Therefore, the information transmitted to the control console is processed in a computer system built into the console itself. The computer system deduces the lift control and maintenance instructions based on the information received. The control console then transmits regulation instructions to the lift installation load weighing device via the data transmitter-receiver.

Furthermore, the control console has the advantage of being able to store in memory a large number of data relating to the control and maintenance work performed on the lift installations and this data can be consulted without going to the outside of the lift cabin to consult the data from a predetermined load weighing device.

The load weighing device supplies all the lift cabin data to the control console via radio. Furthermore, the console is compatible with other lift installation equipment and contains an operating log, with visit number, installation location, serial number, incidents, chain couplings, etc.

The portable weighing machine 6 is a means of weighing provided to the operator to make measurements of weights and sums of weights detected on site at a lift installation before introducing the weighed loads to the lift cabin. The sum of the weights is transmitted from the weighing machine to the control console and the load weighing device by radio. This means that it is not necessary to transport previously known weights to a lift installation as loads of unknown weight can be used with their weight being known once they have been weighed on the weighing machine.

The function of placing a known weight inside the lift cabin is to adjust the load weighing device, to confirm and evaluate the pre-calibration of the lift installation.

The control console includes an audio-visual screen adapted to show menus through which an operator can enter parameters and data and/or receive information.

The control console is also compatible with other lift installation equipment.

The invention claimed is:

1. An automated method of control and evaluation of the operation of a lift installation, characterised in that the method comprises the steps of Weighing a load of at least one weight by means of a weighing machine (6);

Transmission via a data emitter (7), included in the weighing machine (6), of the sum of the weights detected on site in the lift installation where the maintenance work is being performed, to a portable control console (5);

Transmission via a data transmitter-receiver, included in the portable control console (5), to a load weighing device (1) of the sum of the weights detected associated with the loads inserted in the lift cabin (2); and Receipt via a data emitter-receiver (4), included in the load weighing device (1), of command signals associated with the control and maintenance tasks, transmitted from the portable control console (5), as a response to operating parameters of the lift cabin (2) loaded with the sum of the weights detected.

2. An automatic arrangement for control and evaluation of the operation of a lift installation; characterised in that the arrangement comprises a weighing machine (6) adapted to weigh unknown loading weights outside a lift cabin (2); the weighing machine (6) includes a data emitter (7) adapted to transmit the sum of the weights detected on site in the lift installation where maintenance work is being performed to a portable control console (5) which includes a data transmitter-receiver adapted to transmit the sum of the weights detected associated with the loads introduced to the lift cabin (2) to a load weighing device (1) which receives, via a data emitter-receiver (4), command signals associated with control and maintenance tasks from the portable control console (5), as a response to the operating parameters of the lift cabin (2) loaded with the sum of the weights detected.

3. An arrangement as per claim 1, characterised in that the load weighing device (1) includes a communications port (3) of the USB port type that can be connected to the data emitter receiver (4).

4. An arrangement as per claim 2, characterised in that the automatic control arrangement uses a wireless communications protocol of the Wi-Fi or Bluetooth type.

\* \* \* \* \*